US 8,606,485 B1

United States Patent
Ando

(10) Patent No.: US 8,606,485 B1
(45) Date of Patent: Dec. 10, 2013

(54) CONTROL DEVICE FOR INTERNAL COMBUSTION ENGINE AND CONTROL METHOD FOR INTERNAL COMBUSTION ENGINE

(75) Inventor: Daigo Ando, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/142,550

(22) PCT Filed: Sep. 22, 2010

(86) PCT No.: PCT/JP2010/066364
§ 371 (c)(1),
(2), (4) Date: Jun. 28, 2011

(87) PCT Pub. No.: WO2012/039029
PCT Pub. Date: Mar. 29, 2012

(51) Int. Cl.
*F02D 29/02* (2006.01)
*F02D 41/14* (2006.01)
*F02D 45/00* (2006.01)

(52) U.S. Cl.
USPC .......................................... 701/102; 701/112

(58) Field of Classification Search
USPC ......... 701/102, 112, 113, 22, 115; 123/339.1, 123/339.22, 179.4, 179.12, 179.13
See application file for complete search history.

(56) References Cited

FOREIGN PATENT DOCUMENTS

| JP | A-2002-266674 | 9/2002 | | |
|---|---|---|---|---|
| JP | A-2004-60526 | 2/2004 | | |
| JP | A-2004-204724 | 7/2004 | | |
| JP | A-2005-325794 | 11/2005 | | |
| JP | A-2006-83734 | 3/2006 | | |
| JP | A-2007-99165 | 4/2007 | | |
| JP | A-2009-40234 | 2/2009 | | |
| JP | A-2009-274553 | 11/2009 | | |
| JP | A-2010-65529 | 3/2010 | | |
| JP | 2010265867 A | * | 11/2010 | ............... F02D 29/02 |
| JP | 2012047161 A | * | 3/2012 | ............... F02D 29/02 |

OTHER PUBLICATIONS

Jul. 24, 2012 Office Action issued in Japanese Patent Application No. 2011-524083 (with translation).
International Search Report dated Oct. 26, 2010 in corresponding International Application No. PCT/JP2010/066364 (with translation).

* cited by examiner

*Primary Examiner* — Hieu T Vo
(74) *Attorney, Agent, or Firm* — Oliff & Berridge, PLC

(57) ABSTRACT

An ECU executes a program including a step (S102) of prohibiting idle priority control if automatic stop control of an engine is prohibited (YES in S100), and a step (S104) of permitting the idle priority control if the automatic stop control of the engine is not prohibited (NO in S100).

5 Claims, 9 Drawing Sheets

CONTROL DEVICE FOR INTERNAL COMBUSTION ENGINE AND CONTROL METHOD FOR INTERNAL COMBUSTION ENGINE

TECHNICAL FIELD

The present invention relates to control of an internal combustion engine which is mounted in a hybrid vehicle and for which automatic stop is performed, and in particular to a technique of suppressing degradation of fuel efficiency.

BACKGROUND ART

In a vehicle equipped with an internal combustion engine, it is necessary to perform various types of learning such as ISC (Idle Speed Control) when the internal combustion engine is in an idle state. However, when automatic stop control of an internal combustion engine is executed as in a hybrid vehicle having a rotating electric machine and an internal combustion engine as motive power sources, the internal combustion engine is caused to stop upon stopping of the vehicle. Thus, the internal combustion engine enters the idle state less frequently, and there arises a problem that opportunities for various types of learning described above are not fully ensured.

In view of such a problem, Japanese Patent Laying-Open No. 2009-274553 (Patent Document 1) provides a vehicle including an internal combustion engine and a motor capable of outputting motive power for running that performs ISC (Idle Speed Control) learning and improves fuel efficiency at the same time. The vehicle includes the internal combustion engine, the motor, power storage means, a fuel efficiency priority instruction switch providing an instruction to prioritize fuel efficiency, and control means controlling the internal combustion engine and the motor. In the case where ISC learning has not been completed, if an instruction to prioritize fuel efficiency is provided by the fuel efficiency priority instruction switch, the control means causes the internal combustion engine to be operated intermittently to perform the ISC learning while the internal combustion engine is in operation.

According to the vehicle disclosed in the above publication, automatic stop control is executed on the internal combustion engine, and the ISC learning is performed while the internal combustion engine is in operation. Further, fuel efficiency is improved in response to the instruction to prioritize fuel efficiency. As a result, the ISC learning is performed and fuel efficiency is improved at the same time.

CITATION LIST

Patent Documents

Patent Document 1: Japanese Patent Laying-Open No. 2009-274553

SUMMARY OF INVENTION

Technical Problem

However, if control causing an internal combustion engine to be forcibly shifted to an idle state as disclosed in the above publication is executed frequently, fuel efficiency may be degraded.

The present invention has been made to solve the aforementioned problem, and one object of the present invention is to provide a control device for an internal combustion engine and a control method for an internal combustion engine suppressing degradation of fuel efficiency.

Solution to Problem

A control device for an internal combustion engine in accordance with an aspect of the present invention is a control device for an internal combustion engine mounted in a vehicle. The control device includes a detection unit for detecting a state of the vehicle, and a control unit for executing automatic stop control of the internal combustion engine and idle priority control forcibly shifting a state of the internal combustion engine to an idle state, based on the state of the vehicle. If the automatic stop control is prohibited, the control unit causes the idle priority control not to be executed.

Preferably, if the automatic stop control is prohibited, and prohibition of stop of the internal combustion engine will continue for not less than a first time period, the control unit causes the idle priority control not to be executed.

More preferably, the vehicle includes a rotating electric machine for causing the vehicle to run, and a power storage device for supplying electric power to the rotating electric machine. If the automatic stop control is prohibited, and a temperature-rising time taken until a temperature of the power storage device at present becomes higher than a temperature at which the automatic stop control is permitted will be not less than a first time period, the control unit causes the idle priority control not to be executed.

More preferably, if a temperature-rising rate of the temperature of the power storage device is lower than a predetermined value, the control unit determines that the temperature-rising time will be not less than the first time period.

More preferably, if a first temperature of the power storage device detected by the detection unit is lower than a second temperature, the control unit determines that the temperature-rising time will be not less than the first time period. The second temperature is a temperature at which temperature-rising is started in a case where the temperature-rising time will be not less than the first time period if a temperature-rising rate of the temperature of the power storage device is at maximum.

More preferably, the control unit determines the first time period based on the state of the vehicle.

A control device for an internal combustion engine in accordance with another aspect of the present invention is a control device for an internal combustion engine mounted in a vehicle. The control device includes a detection unit for detecting a state of the vehicle, and a control unit for executing automatic stop control of the internal combustion engine and idle priority control forcibly shifting a state of the internal combustion engine to an idle state, based on the state of the vehicle. If a prohibition condition for the automatic stop control is satisfied, the control unit causes the idle priority control not to be executed before it prohibits the automatic stop control.

Preferably, if the prohibition condition is satisfied, and prohibition of stop of the internal combustion engine will continue for not less than a first time period, the control unit causes the idle priority control not to be executed before it prohibits the automatic stop control.

A control device for an internal combustion engine in accordance with still another aspect of the present invention is a control device for an internal combustion engine mounted in a vehicle. The vehicle includes a rotating electric machine for causing the vehicle to run, and a power storage device for supplying electric power to the rotating electric machine. The control device includes a detection unit for detecting a state of the vehicle, and a control unit for executing automatic stop control of the internal combustion engine and idle priority control forcibly shifting a state of the internal combustion engine to an idle state, based on the state of the vehicle. If the automatic stop control is prohibited, and a temperature-rising time taken until a temperature of the power storage device at present becomes higher than a temperature at which the automatic stop control is permitted will be not less than a first time period, the control unit causes the idle priority control not to be executed.

A control method for an internal combustion engine in accordance with still another aspect of the present invention is a control method for an internal combustion engine mounted in a vehicle. The control method includes the steps of: detecting a state of the vehicle; executing automatic stop control of the internal combustion engine and idle priority control forcibly shifting a state of the internal combustion engine to an idle state, based on the state of the vehicle; and causing the idle priority control not to be executed if the automatic stop control is prohibited.

A control method for an internal combustion engine in accordance with still another aspect of the present invention is a control method for an internal combustion engine mounted in a vehicle. The control method includes the steps of: detecting a state of the vehicle; executing automatic stop control of the internal combustion engine and idle priority control forcibly shifting a state of the internal combustion engine to an idle state, based on the state of the vehicle; and, if a prohibition condition for the automatic stop control is satisfied, causing the idle priority control not to be executed before prohibiting the automatic stop control.

Advantageous Effects of Invention

According to the present invention, a control device for an internal combustion engine and a control method for an internal combustion engine suppressing degradation of fuel efficiency by causing the idle priority control not to be executed if the automatic stop control is prohibited can be provided.

DESCRIPTION OF EMBODIMENTS

Figure 1:
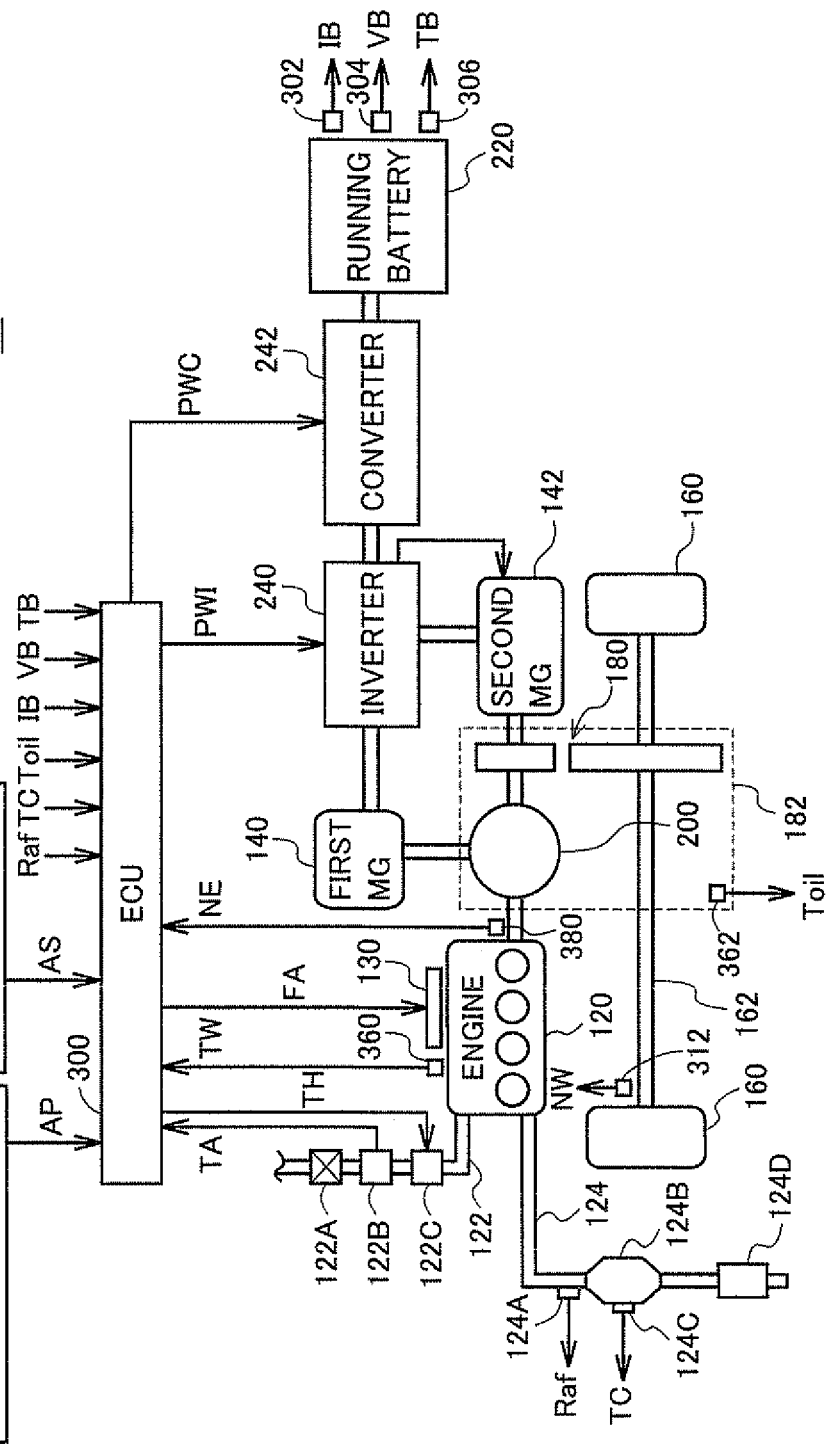
FIG. 1 is a control block diagram showing an entire configuration of a hybrid vehicle mounted with a control device for an internal combustion engine in accordance with a first embodiment.

Hereinafter, embodiments of the present invention will be described with reference to the drawings. In the description below, identical parts will be designated by the same reference numerals. Since their names and functions are also the same, the detailed description thereof will not be repeated.

First Embodiment

Referring to FIG. 1, a control block diagram of a hybrid vehicle 10 to which a control device for an internal combustion engine in accordance with an embodiment of the present invention is applied will be described.

Hybrid vehicle 10 includes an engine 120, a first motor generator (hereinafter referred to as a first MG) 140, a second motor generator (hereinafter referred to as a second MG) 142, drive wheels 160, a transmission 182, a running battery 220, an inverter 240, a converter 242, and an ECU (Electronic Control Unit) 300.

Hybrid vehicle 10 is not particularly limited to the one having the configuration shown in FIG. 1, as long as it is at least a vehicle that can run using a rotating electric machine even if an internal combustion engine is stopped. For example, hybrid vehicle 10 may be a so-called parallel-type hybrid vehicle that runs under certain conditions with engine 120 being stopped, using a drive motor generator directly coupled to a crankshaft of engine 120.

The first MG 140 is a rotating electric machine. The first MG 140 has a function as a generator generating electric power using motive power of engine 120 and charging running battery 220 through inverter 240 and converter 242. In addition, the first MG 140 receives electric power from running battery 220 and rotates the crankshaft of engine 120. Thereby, the first MG 140 has a function as a starter starting engine 120.

The second MG 142 is a rotating electric machine. The second MG 142 has a function as a drive motor supplying drive force to drive wheels 160. In addition, the second MG 142 has a function as a generator charging running battery 220 by regenerative braking.

Engine 120 is an internal combustion engine, for example, such as a gasoline engine, a diesel engine, or the like. An intake path 122 of engine 120 is provided with an air cleaner 122A, an intake air temperature sensor 122B, and an electronic throttle valve 122C.

Air cleaner 122A captures dust in intake air. Intake air temperature sensor 122B detects a temperature TA of air to be taken into engine 120 through air cleaner 122A. Intake air temperature sensor 122B sends a signal indicating detected temperature TA of the air (hereinafter also referred to as external air temperature TA) to ECU 300.

Electronic throttle valve 122C includes a valve for adjusting the amount of air to be taken into engine 120, a throttle motor operating the valve based on a control signal TH from ECU 300, and a throttle valve position sensor for detecting a signal indicating an opening degree of the valve and sending it to ECU 300.

Engine 120 includes a plurality of cylinders and a fuel injection device 130 supplying fuel to each of the plurality of cylinders. Fuel injection device 130 injects an appropriate amount of fuel to each cylinder at appropriate timing based on a fuel injection control signal FA from ECU 300.

Further, an exhaust path 124 of engine 120 is provided with a three-way catalytic converter 124B as a catalyst for purifying exhaust air, an air-fuel ratio sensor 124A detecting an air-fuel ratio (A/F) Raf in exhaust gas to be introduced into three-way catalytic converter 124B, a catalyst temperature sensor 124C for detecting a temperature TC of three-way catalytic converter 124B, and a muffler 124D.

Air-fuel ratio sensor 124A sends a signal indicating detected air-fuel ratio Raf to ECU 300. Catalyst temperature sensor 124C sends a signal indicating temperature TC of three-way catalytic converter 124B to ECU 300. Instead of air-fuel ratio sensor 124A, an oxygen sensor may be used.

Engine 120 is further provided with a water temperature sensor 360 for detecting a temperature TW of cooling water flowing through an inside of engine 120, and an engine revolution speed sensor 380 for detecting a revolution speed NE of the crankshaft of engine 120. Water temperature sensor 360 sends a signal indicating detected temperature TW of the cooling water to ECU 300. Engine revolution speed sensor 380 sends a signal indicating detected revolution speed NE of the crankshaft of engine 120 to ECU 300.

Transmission 182 includes a reduction gear 180, a motive power split mechanism 200, and an oil temperature sensor 362 for detecting a temperature Toil of hydraulic oil inside transmission 182. Reduction gear 180 transmits motive power generated by engine 120 and the second MG 142 to drive wheels 160. Reduction gear 180 also transmits reaction force from a road surface received by drive wheels 160 to engine 120 and the second MG 142. Oil temperature sensor 362 sends a signal indicating detected temperature Toil of the hydraulic oil inside transmission 182 to ECU 300.

Motive power split mechanism 200 is, for example, a planetary gear mechanism. Motive power split mechanism 200 splits the motive power generated by engine 120 into two routes: to drive wheels 160 and to the first MG 140. The planetary gear mechanism includes a sun gear, a ring gear, a carrier, and a pinion gear. For example, the sun gear of the planetary gear mechanism is connected to the first MG 140, the carrier is connected to engine 120, and the ring gear is connected to the second MG 142. A transmission mechanism may be provided between the ring gear and the second MG 142.

To divide the motive power of engine 120 into both drive wheels 160 and the first MG 140, the planetary gear mechanism (planetary gear) is used as motive power split mechanism 200. By controlling a revolution speed of the first MG 140, motive power split mechanism 200 also serves as a continuously variable transmission.

Running battery 220 is a power storage device storing electric power for driving the first MG 140 and the second MG 142. Running battery 220 outputs direct-current (DC) power. In the present embodiment, running battery 220 is a chargeable secondary battery. Running battery 220 is formed, for example, using a nickel hydride battery, a lithium ion battery, or the like. Running battery 220 is not limited thereto, and the one capable of generating DC voltage, for example, such as a capacitor, a solar battery, a fuel battery, or the like is also applicable.

Running battery 220 is provided with a current sensor 302 for detecting a current IB of running battery 220, a voltage sensor 304 for detecting a voltage VB of running battery 220, and a battery temperature sensor 306 for detecting a battery temperature TB of running battery 220.

Current sensor 302 sends a signal indicating current IB to ECU 300. Voltage sensor 304 sends a signal indicating voltage VB to ECU 300. Battery temperature sensor 306 sends a signal indicating battery temperature TB to ECU 300.

Converter 242 boosts the DC power output from running battery 220, and outputs it to inverter 240. Converter 242 is operated based on a control signal PWC from ECU 300. ECU 300 controls converter 242 by generating control signal PWC such that an output voltage of converter 242 is equal to a target voltage. Converter 242 has a built-in smoothing capacitor. When converter 242 performs a boost operation, a charge is stored in the smoothing capacitor.

Inverter 240 performs mutual conversion between DC from running battery 220 and alternating current (AC) from the first MG 140 and the second MG 142. Inverter 240 receives the DC power from converter 242 as an input, converts it into AC power corresponding to a frequency command value based on a control signal PWI from ECU 300, and outputs it to the first MG 140 and the second MG 142.

ECU 300 controls engine 120, inverter 240, converter 242, and the like, and thereby controls an entire hybrid system, that is, the state of charge/discharge of running battery 220 and operation states of engine 120, the first MG 140, and the second MG 142, such that hybrid vehicle 10 runs most efficiently.

Although ECU 300 has been described in FIG. 1 as one ECU, two or more ECUs may be used. For example, the operation of ECU 300 in FIG. 1 may be separately performed by an engine ECU for controlling engine 120 and a hybrid ECU for controlling inverter 240 and converter 242.

A driver seat is provided with an accelerator pedal (not shown). An accelerator position sensor 308 detects a depression amount Ac of the accelerator pedal. Accelerator position sensor 308 sends a signal indicating depression amount Ac of the accelerator pedal to ECU 300.

ECU 300 controls outputs or power generation amounts of the first MG 140 and the second MG 142 and an output of engine 120 according to required drive force corresponding to depression amount Ac of the accelerator pedal.

The driver seat is further provided with an air-conditioning switch 310. Air-conditioning switch 310 may be, for example, a switch activating a heater. Alternatively, air-conditioning switch 310 may be a switch activating an air conditioner in an automatic control mode in which the temperature inside a vehicle cabin is automatically adjusted to a preset temperature. For example, ECU 300 may determine that it has received a request to activate a heater when air-conditioning switch 310 is manipulated, or may determine that it has received a request to activate a heater when the temperature inside the vehicle cabin is lower than the preset temperature.

Further, a drive shaft 162 of drive wheels 160 is provided with a wheel speed sensor 312 for detecting a revolution speed NW of drive wheels 160. Wheel speed sensor 312 sends a signal indicating detected revolution speed NW of drive wheels 160 to ECU 300. ECU 300 calculates a speed V of hybrid vehicle 10 based on revolution speed NW of drive wheels 160.

ECU 300 also determines whether or not running battery 220 is deteriorated. For example, ECU 300 may detect voltages of battery cells included in running battery 220, and determine that running battery 220 is deteriorated if voltage variations are caused in the battery cells. Alternatively, ECU 300 may integrate a current input/output to/from running battery 220, and determine that running battery 220 is deteriorated if an integrated value exceeds a threshold value.

Further, ECU 300 detects a failure in components of a battery system and an electric oil pump for transmission 182. The components of the battery system include, for example, running battery 220, wires connected to running battery 220, current sensor 302, and voltage sensor 304. ECU 300 may determine that the components of the battery system have a failure, for example, if the SOC of running battery 220 and output values of the current sensor and the voltage sensor are not normal values. Alternatively, ECU 300 may determine that the electric oil pump has a failure, for example, if the electric oil pump cannot be operated.

In hybrid vehicle 10 having a configuration as described above, if efficiency of engine 120 is poor for example at startup and during low-speed running, hybrid vehicle 10 runs only using the second MG 142. Further, during normal running, for example, the motive power of engine 120 is split into two routes by motive power split mechanism 200. One of the split motive powers is used to directly drive drive wheels 160, and the other of the split motive powers is used to drive the first MG 140 and generate electric power. On this occasion, ECU 300 drives the second MG 142 using the generated electric power. Driving of drive wheels 160 is assisted by driving the second MG 142.

On the other hand, during deceleration, the second MG 142 driven by drive wheels 160 serves as a generator to perform regenerative power generation. Electric power collected by the regenerative power generation is stored in running battery 220. It is to be noted that, if a charge amount in running battery 220 is reduced and charging is particularly required, ECU 300 increases the output of engine 120, increases the power generation amount by the first MG 140, and increases the charge amount for running battery 220. Further, ECU 300 may execute control for increasing drive force from engine 120 as necessary even during low-speed running, for example when running battery 220 should be charged as described above, when an auxiliary machine such as an air conditioner is driven, when temperature TW of the cooling water for engine 120 is increased to a prescribed temperature, and the like.

In addition, in hybrid vehicle 10 as shown in FIG. 1, ECU 300 executes automatic stop control on engine 120. That is, ECU 300 causes engine 120 to stop automatically to improve fuel efficiency, depending on the operation state of hybrid vehicle 10 and the state of running battery 220. Even after ECU 300 causes engine 120 to stop, ECU 300 causes engine 120 to be restarted, depending on the operation state of hybrid vehicle 10 and the state of running battery 220.

Specifically, if an automatic stop permission condition for the state of hybrid vehicle 10 is satisfied, ECU 300 permits execution of the automatic stop control of engine 120. If the automatic stop permission condition is not satisfied, ECU 300 prohibits execution of the automatic stop control.

The automatic stop permission condition includes a first permission condition that battery temperature TB of running battery 220 is higher than a predetermined temperature TB(0). Predetermined temperature TB(0) is set such that running battery 220 can supply electric power allowing hybrid vehicle 10 to run only using the second MG 142 with engine 120 being stopped (hereinafter also referred to as EV running) and electric power allowing engine 120 to start using the first MG 140.

The automatic stop permission condition includes a second permission condition that the residual capacity, that is, the SOC (State Of Charge), of running battery 220 is higher than a predetermined value SOC(0). Predetermined value SOC(0) is set to suppress acceleration of deterioration of running battery 220 by protecting running battery 220 from overdischarge during the EV running. Further, predetermined value SOC(0) is set to ensure electric power allowing engine 120 to start using the first MG 140.

The automatic stop permission condition includes a third permission condition that temperature TW of the cooling water for engine 120 is higher than a predetermined temperature TW(0). Predetermined temperature TW(0) is a threshold value for determining that warming-up of engine 120 has been completed.

The automatic stop permission condition includes a fourth permission condition that temperature TC of three-way catalytic converter 124B is higher than a predetermined temperature TC(0). Predetermined temperature TC(0) is a threshold value for determining that warming-up of three-way catalytic converter 124B has been completed.

The automatic stop permission condition includes a fifth permission condition that speed V of hybrid vehicle 10 is lower than a predetermined speed V(0). Predetermined speed V(0) is a threshold value of speed V for preventing excessive revolution of the first MG 140. Further, predetermined speed V(0) is set such that running battery 220 can supply electric power allowing hybrid vehicle 10 to run only using the second MG 142 with engine 120 being stopped (hereinafter also referred to as EV running) and electric power allowing engine 120 to start using the first MG 140.

The automatic stop permission condition includes a sixth permission condition that temperature Toil of the hydraulic oil in transmission 182 is lower than a predetermined temperature Toil(0). The hydraulic oil in transmission 182 has a viscosity which is increased with a decrease in temperature. If the viscosity of the hydraulic oil is increased, a discharge amount from the electric oil pump is increased. Therefore, predetermined temperature Toil(0) is set such that a required discharge amount can be acquired only by the electric oil pump with engine 120 being stopped.

The automatic stop permission condition includes a seventh permission condition that there is no request to activate a heater. For example, if air-conditioning switch 310 is in an OFF state, or if the temperature inside the vehicle cabin is higher than the preset temperature, ECU 300 determines that there is no request to activate a heater.

The automatic stop permission condition includes an eighth permission condition that running battery 220 is not deteriorated. ECU 300 determines whether or not running battery 220 is deteriorated, for example, based on voltage variations in the battery cells or the integrated value of the current input/output to/from running battery 220, as described above.

The automatic stop permission condition includes a ninth permission condition that the components of the battery system and the electric oil pump for transmission 182 do not have a failure. Since determination of a failure in the components of the battery system and the electric oil pump for transmission 182 is as described above, the detailed description thereof will not be repeated.

It is to be noted that the automatic stop permission condition is not limited to the first permission condition to the ninth permission condition described above. Other conditions may be added thereto, or at least one of these conditions may be used as the automatic stop permission condition.

If all of the first permission condition to the ninth permission condition described above are satisfied after system start-up of hybrid vehicle 10, ECU 300 permits the automatic stop control. In contrast, if at least one of the first permission condition to the ninth permission condition described above is not satisfied, ECU 300 prohibits the automatic stop control. In this case, ECU 300 causes engine 120 to be continuously operated, and does not execute automatic stop of engine 120. That is, a prohibition condition for prohibiting the automatic stop control is that the automatic stop permission condition is not satisfied.

In hybrid vehicle 10 as described above, ISC learning, learning of an air-fuel ratio of a port injection device, and diagnosis on an imbalanced state of air-fuel ratios of the cylinders (hereinafter referred to as imbalance diagnosis) are performed.

When the ISC learning is performed, ECU 300 adjusts an opening degree of electronic throttle valve 122C such that an idle revolution speed of engine 120 is equal to a target revolution speed. ECU 300 learns the adjusted opening degree of electronic throttle valve 122C as an opening degree corresponding to an idle state.

The ISC learning is performed when engine 120 is in the idle state, if engine 120 has been completely warmed up (i.e., temperature TW of the cooling water for engine 120 is higher than TW(0)) and the ISC learning has not been performed during a period from the system start-up of hybrid vehicle 10 to most recent stop thereof (i.e., one trip).

The learning of the air-fuel ratio of the port injection device is performed on engine 120 having the port injection device and an in-cylinder injection device. By the learning of the air-fuel ratio of the port injection device, ECU 300 learns an air-fuel ratio in the case where the port injection device performs 100% of injection. The learning of the air-fuel ratio of the port injection device is performed when engine 120 is in the idle state, if engine 120 is cooled (i.e., temperature TW of the cooling water for engine 120 is lower than TW(0)) and the learning of the air-fuel ratio of the port injection device has not been performed during one trip.

The imbalance diagnosis is performed when hybrid vehicle 10 is in a stopped state and engine 120 is in the idle state, to diagnose the imbalanced state of the air-fuel ratios with high accuracy. ECU 300 detects the air-fuel ratios of the cylinders using air-fuel ratio sensor 124A and engine revolution speed sensor 380. ECU 300 diagnoses whether or not the air-fuel ratios of the cylinders are in the imbalanced state based on variations in the air-fuel ratios of the cylinders.

In the case where the automatic stop control is executed on engine 120, a period for which engine 120 is in the idle state while engine 120 is in operation is shorter than that in a conventional vehicle (i.e., a vehicle mounted with an engine only). Thus, there may be some cases where learning accuracy in the ISC learning or the learning of the air-fuel ratio of the port injection device and diagnosis accuracy of the imbalance diagnosis cannot be fully ensured.

Therefore, ECU 300 executes control for forcibly shifting the state of engine 120 to the idle state while engine 120 is in operation (referred to as idle priority control in the description below). For example, if engine 120 has been completely warmed up, the ISC learning has not been performed during one trip, and the EV running is possible, ECU 300 executes the idle priority control, and performs the ISC learning. ECU 300 terminates the idle priority control upon completion of the ISC learning. When ECU 300 performs the learning of the air-fuel ratio of the port injection device and the imbalance diagnosis, ECU 300 also executes the idle priority control and performs the learning or diagnosis. ECU 300 terminates the idle priority control upon completion of the learning or diagnosis.

Opportunities for the learning or diagnosis described above can be ensured reliably by executing the idle priority control as described above. However, if engine 120 frequently enters the idle state while engine 120 is in operation, there is a possibility that fuel efficiency may be degraded.

Thus, the present embodiment is characterized in that, if the automatic stop control is prohibited, ECU 300 causes the idle priority control not to be executed.

Figure 2:
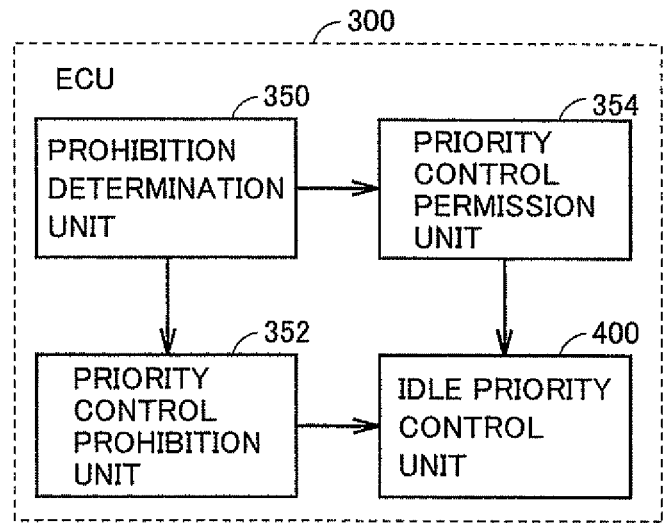
FIG. 2 is a functional block diagram of an ECU as the control device for the internal combustion engine in accordance with the first embodiment.

FIG. 2 shows a functional block diagram of ECU 300 as the control device for the internal combustion engine in accordance with the present embodiment.

ECU 300 includes a prohibition determination unit 350, a priority control prohibition unit 352, a priority control permission unit 354, and an idle priority control unit 400.

Prohibition determination unit 350 determines whether or not the automatic stop control is prohibited. Specifically, if one of the first permission condition to the ninth permission condition described above is not satisfied, prohibition determination unit 350 determines that the automatic stop control is prohibited. If all of the first permission condition to the ninth permission condition are satisfied, prohibition determination unit 350 determines that the automatic stop control is not prohibited (i.e., is permitted).

It is to be noted that, for example, if prohibition determination unit 350 determines that the automatic stop control is prohibited, prohibition determination unit 350 may turn on a prohibition determination flag, and if prohibition determination unit 350 determines that the automatic stop control is not prohibited, prohibition determination unit 350 may turn off the prohibition determination flag.

If prohibition determination unit 350 determines that the automatic stop control is prohibited, priority control prohibition unit 352 prohibits the idle priority control to cause the idle priority control not to be executed. For example, if the prohibition determination flag is ON, priority control prohibition unit 352 may turn on an idle priority control prohibition flag.

If prohibition determination unit 350 determines that the automatic stop control is not prohibited, priority control permission unit 354 permits the idle priority control. If the idle priority control is prohibited, priority control permission unit 354 lifts prohibition thereof. For example, if the prohibition determination flag is OFF, priority control permission unit 354 may turn off the idle priority control prohibition flag.

If the idle priority control is permitted, idle priority control unit 400 executes the idle priority control. It is to be noted that idle priority control unit 400 may execute the idle priority control in the case where the automatic stop control is permitted, in addition to the case where, for example, engine 120 has been completely warmed up, the learning or diagnosis has not been performed during one trip, and the EV running is possible.

Further, if the idle priority control is prohibited, idle priority control unit 400 does not execute the idle priority control. Idle priority control unit 400 does not execute the idle priority control even in the case where, for example, engine 120 has been completely warmed up, the learning or diagnosis has not been performed during one trip, and the EV running is possible.

It is to be noted that, for example, if the idle priority control prohibition flag is ON, idle priority control unit 400 may prohibit the idle priority control. Further, if the idle priority control prohibition flag is OFF, idle priority control unit 400 may execute the idle priority control in the case where, for example, engine 120 has been completely warmed up, the learning or diagnosis has not been performed during one trip, and the EV running is possible.

Although prohibition determination unit 350, priority control prohibition unit 352, priority control permission unit 354, and idle priority control unit 400 are described in the present embodiment to serve as software implemented by a CPU of ECU 300 executing a program stored in a memory, they may be implemented by hardware. Such a program is recorded in a recording medium and mounted in the vehicle.

Figure 3:
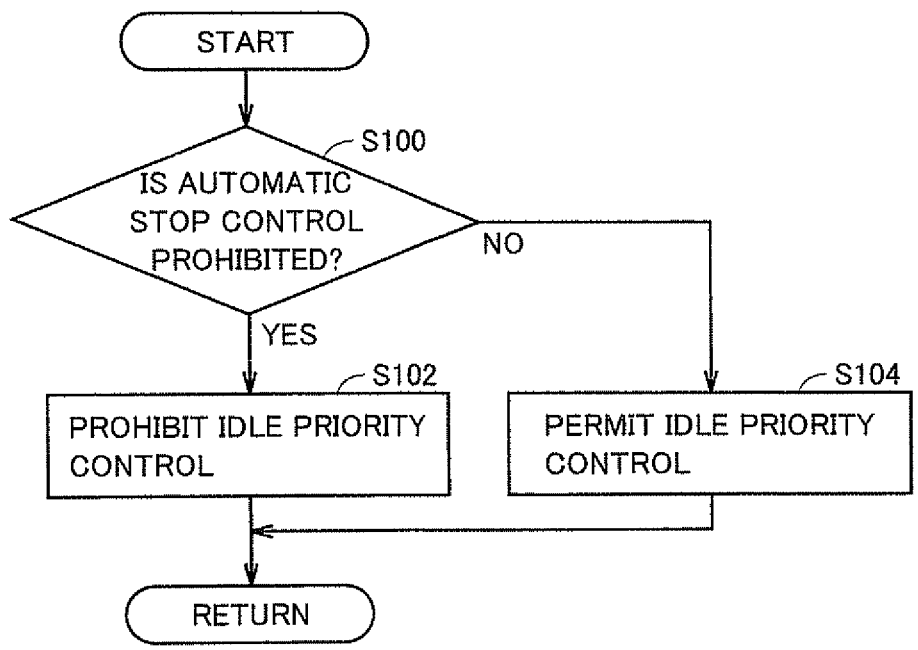
FIG. 3 is a flowchart showing a control structure of a program executed by the ECU as the control device for the internal combustion engine in accordance with the first embodiment.

Referring to FIG. 3, a control structure of the program executed by ECU 300 as the control device for the internal combustion engine in accordance with the present embodiment will be described.

In step (hereinafter described as S) 100, ECU 300 determines whether or not the automatic stop control on engine 120 is prohibited. Specifically, ECU 300 determines that the automatic stop control on engine 120 is prohibited if one of the first permission condition to the ninth permission condition described above is not satisfied. If the automatic stop control on engine 120 is prohibited (YES in S100), the process proceeds to S102. Otherwise (NO in S100), the process proceeds to S104.

In S102, ECU 300 prohibits the idle priority control to cause the idle priority control not to be executed. In S104, ECU 300 permits the idle priority control.

Figure 4:
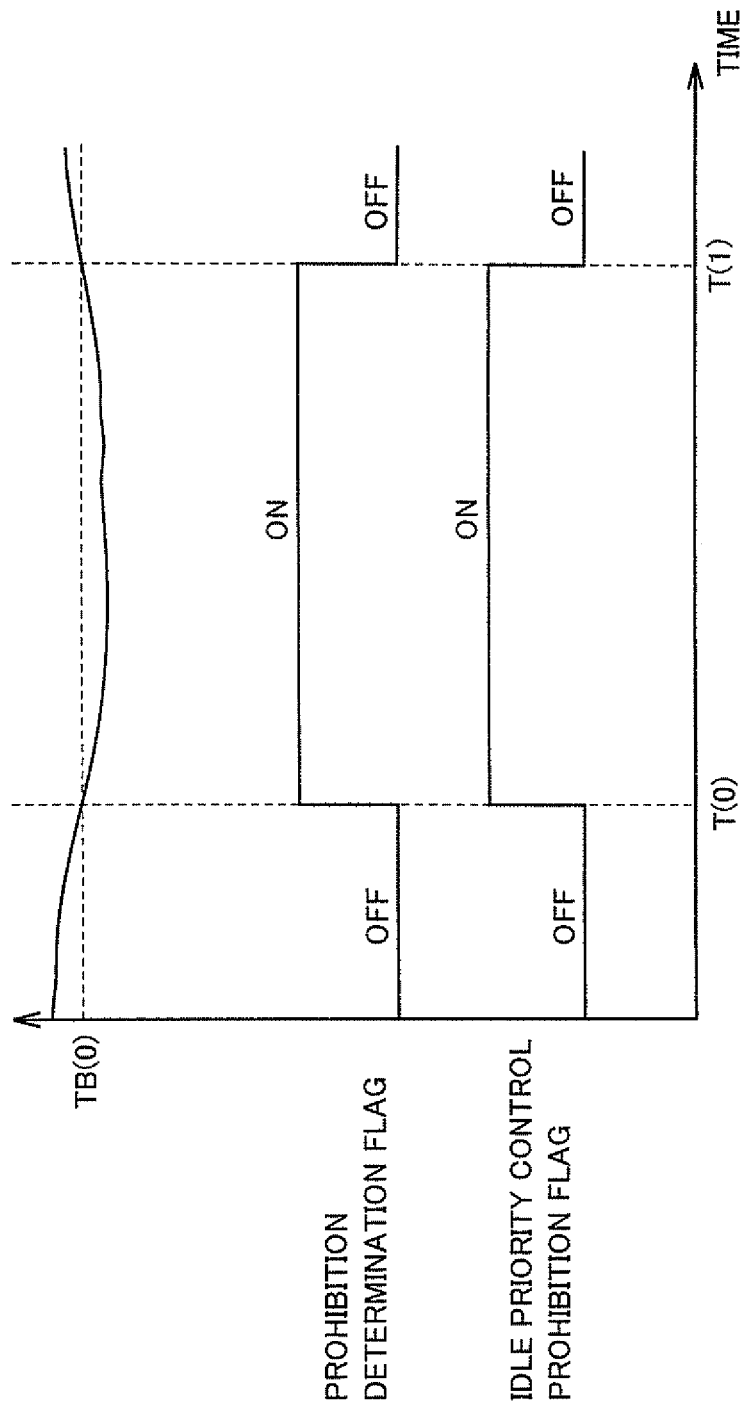
FIG. 4 is a timing chart showing an operation of the ECU as the control device for the internal combustion engine in accordance with the first embodiment.

An operation of ECU 300 as the control device for the internal combustion engine in accordance with the present embodiment based on the structure and the flowchart as described above will be described with reference to FIG. 4. For convenience of description, it is assumed in the present embodiment that, for example, of the first permission condition to the ninth permission condition, the only thing that is changed is whether or not the first permission condition for battery temperature TB of running battery 220 is satisfied, and all of the second permission condition to the ninth permission condition are satisfied. It is to be noted that, since the operation of ECU 300 in the case where there is a change in whether or not a condition other than the first permission condition is satisfied is identical to the operation of ECU 300 in the case where there is a change in whether or not the first permission condition is satisfied, the detailed description of the operation of the ECU in the case where there is a change in whether or not a condition other than the first permission condition is satisfied will not be repeated. Further, a change in battery temperature TB of running battery 220 shown in FIG. 4 is exemplary, and its change is not limited to the change shown in FIG. 4.

For example, it is assumed that the automatic stop permission condition (i.e., the first permission condition to the ninth permission condition) is completely satisfied.

If battery temperature TB of running battery 220 is reduced, and battery temperature TB becomes lower than TB(0) at time T(0), the first permission condition of the automatic stop permission condition is not satisfied. Therefore, the automatic stop control is prohibited (YES in S100). On this occasion, the state of the prohibition determination flag is switched from OFF to ON, as shown in FIG. 4. If the automatic stop control is prohibited, the idle priority control is prohibited (S102). Therefore, the idle priority control is caused not to be executed. On this occasion, the state of the idle priority control prohibition flag is switched from OFF to ON, as shown in FIG. 4.

Since the automatic stop of engine 120 is not executed when the automatic stop control on engine 120 is prohibited, engine 120 continues operation. Therefore, engine 120 is not caused to be forcibly shifted to the idle state.

While engine 120 continues operation, engine 120 frequently enters the idle state for example when the vehicle is in the stopped state and the like. ECU 300 performs the ISC learning, the learning of the air-fuel ratio of the port injection device, and the imbalance diagnosis described above at timing when engine 120 enters the idle state (for example, when an idle switch is turned on, or engine revolution speed NE falls within a range of revolution speed corresponding to the idle revolution speed).

After time T(0), battery temperature TB of running battery 220 starts increasing. If battery temperature TB becomes equal to or higher than TB(0) at time T(1), the second permission condition is satisfied. On this occasion, the automatic stop permission condition is satisfied. Therefore, prohibition of the automatic stop control of engine 120 is lifted (NO in S100). The state of the prohibition determination flag is switched from ON to OFF, as shown in FIG. 4. If the automatic stop control is permitted, the idle priority control is permitted (S104). Therefore, the state of the idle priority control prohibition flag is switched from ON to OFF, as shown in FIG. 4.

If the automatic stop control is permitted, the automatic stop of engine 120 is executed according to the state of hybrid vehicle 10. For example, when hybrid vehicle 10 is stopped and the like, ECU 300 causes engine 120 to stop. Therefore, the frequency with which engine 120 enters the idle state is lower than that in the case where the automatic stop is prohibited. In such a case, ECU 300 forcibly shifts the state of engine 120 to the idle state, and performs at least one of the ISC learning, the learning of the air-fuel ratio of the port injection device, and the imbalance diagnosis. ECU 300 terminates the idle priority control upon completion of the learning or diagnosis. It is to be noted that ECU 300 may execute the idle priority control while engine 120 is in operation. Alternatively, when engine 120 is in the stopped state, ECU 300 may execute the idle priority control after starting engine 120.

As described above, according to the control device for the internal combustion engine in accordance with the present embodiment, if the automatic stop control is prohibited, the idle priority control is caused not to be executed, and thereby frequent execution of the idle priority control can be suppressed. Consequently, a control device for an internal combustion engine and a control method for an internal combustion engine suppressing degradation of fuel efficiency can be provided.

Further, if the hybrid vehicle is stopped when the automatic stop control on engine 120 is prohibited, engine 120 frequently enters the idle state. Therefore, the ISC learning, the learning of the air-fuel ratio of the port injection device, and the imbalance diagnosis are performed when engine 120 is in the idle state, and thereby opportunities for the learning and diagnosis can be fully ensured. Therefore, learning accuracy and diagnosis accuracy can be improved.

Although it has been described in the present embodiment that ECU 300 lifts prohibition of the idle priority control if prohibition of the automatic stop control is lifted, the timing of lifting prohibition of the idle priority control is not limited thereto. ECU 300 may lift prohibition of the idle priority control, for example, if prohibition of the automatic stop control continues until a time period not less than a predetermined time period has elapsed, and engine 120 does not enter the idle state until the time period not less than the predetermined time period has elapsed.

Second Embodiment

Hereinafter, a control device for an internal combustion engine in accordance with a second embodiment will be described. When compared with the configuration of the control device for the internal combustion engine in accordance with the first embodiment described above, the control device for the internal combustion engine in accordance with the present embodiment is different in the operation of ECU 300. Other than that, the configuration of the control device for the internal combustion engine in accordance with the present embodiment is identical to the configuration of the control device for the internal combustion engine in accordance with the first embodiment described above. Identical parts will be designated by the same reference numerals. Since their functions are also the same, the detailed description thereof will not be repeated here.

The present embodiment is characterized in that, if the automatic stop control is prohibited, and prohibition of the automatic stop control will continue far a long period not less than a first time period, ECU 300 causes the idle priority control not to be executed.

For example, if the automatic stop control is prohibited, ECU 300 may predict whether or not prohibition of the automatic stop control will continue for not less than the first time period from the present. If ECU 300 predicts that prohibition of the automatic stop control will continue for not less than the first time period from the present, ECU 300 may cause the idle priority control not to be executed.

Figure 5:
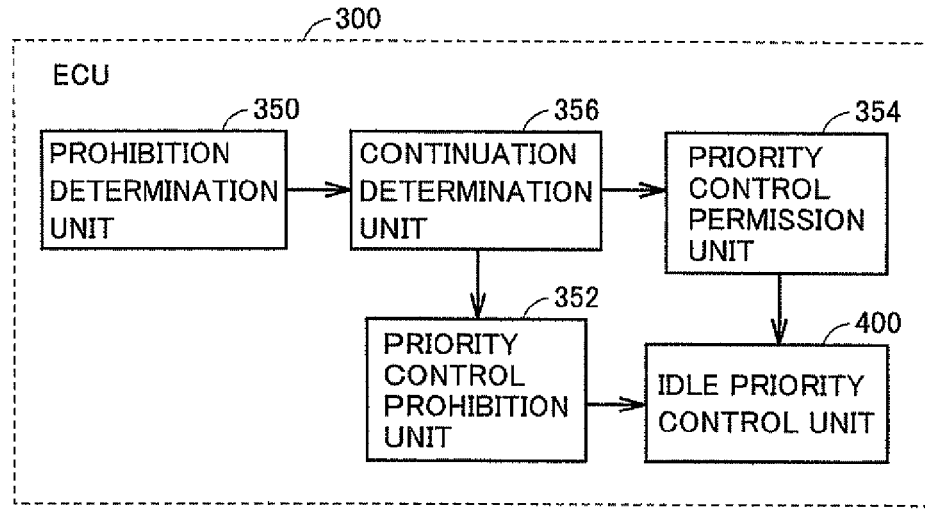
FIG. 5 is a functional block diagram of an ECU as a control device for an internal combustion engine in accordance with a second embodiment.

FIG. 5 shows a functional block diagram of ECU 300 as the control device for the internal combustion engine in accordance with the present embodiment.

ECU 300 includes prohibition determination unit 350, priority control prohibition unit 352, priority control permission unit 354, a continuation determination unit 356, and idle priority control unit 400. Since prohibition determination unit 350 and idle priority control unit 400 shown in FIG. 5 are identical in function and operation to prohibition determination unit 350 and idle priority control unit 400 shown in FIG. 2, respectively, the detailed description thereof will not be repeated.

If prohibition determination unit 350 determines that the automatic stop control is prohibited, continuation determination unit 356 determines whether or not prohibition of the automatic stop control will continue for a long period not less than the first time period.

Specifically, continuation determination unit 356 determines whether or not a continuation determination condition for determining whether or not prohibition of the automatic stop control will continue for a long period not less than the first time period is satisfied. If the continuation determination condition is satisfied, continuation determination unit 356 determines that prohibition of the automatic stop control will continue for a long period not less than the first time period. If the continuation determination condition is not satisfied, continuation determination unit 356 determines that prohibition of the automatic stop control will not continue for a long period not less than the first time period.

Continuation determination unit 356 may determine the first time period based on the frequency with which engine 120 enters the idle state if the automatic stop control is prohibited.

The "first time period" is a period determined based on, for example, the frequency with which engine 120 automatically stops. The "first time period" may be a certain period, or may be a period determined according to the state of the vehicle.

For example, continuation determination unit 356 may determine the first time period when speed V of hybrid vehicle 10 is higher than a predetermined speed to be longer than the first time period when speed V is lower than the predetermined speed. This is because, if the automatic stop control is prohibited, the frequency with which engine 120 enters the idle state when speed V is higher than the predetermined speed is lower than the frequency with which engine 120 enters the idle state when speed V is lower than the predetermined speed.

Alternatively, continuation determination unit 356 may determine the first time period based on the charge/discharge amount of electric power in running battery 220 at present or in the future.

In the present embodiment, the continuation determination condition includes a first continuation condition to a seventh continuation condition. The first continuation condition is a condition that a value obtained by subtracting battery temperature TB at present from predetermined temperature TB(0) is greater than a predetermined value $\Delta$TB. The second continuation condition is a condition that a value obtained by subtracting the SOC at present from predetermined SOC(0) is greater than a predetermined value $\Delta$SOC. The third continuation condition is a condition that a value obtained by subtracting temperature TW of the cooling water at present from predetermined temperature TW(0) is greater than a predetermined value $\Delta$TW. The fourth continuation condition is a condition that a value obtained by subtracting predetermined temperature Toil(0) from temperature Toil of the hydraulic oil in transmission 182 at present is greater than a predetermined value $\Delta$Toil. The fifth continuation condition is a condition that external air temperature TA is lower than a predetermined temperature TA(0), and temperature TW of the cooling water is lower than a predetermined temperature TW(1)(<TW(0)). The sixth continuation condition is a condition that running battery 220 is deteriorated. The seventh continuation condition is a condition that the components of the battery system and the electric oil pump for transmission 182 have a failure.

If at least one of the first continuation condition to the seventh continuation condition is satisfied, continuation determination unit 356 determines that the continuation determination condition is satisfied. As a result, continuation determination unit 356 determines that prohibition of the automatic stop control will continue for a long period not less than the first time period.

Further, if none of the first continuation condition to the seventh continuation condition is satisfied, continuation determination unit 356 determines that the continuation determination condition is not satisfied. As a result, continuation determination unit 356 determines that prohibition of the automatic stop control will not continue for a long period not less than the first time period.

It is to be noted that, for example, if the prohibition determination flag is ON, continuation determination unit 356 may determine whether or not the continuation determination condition is satisfied. If the continuation determination condition is satisfied, continuation determination unit 356 may turn on a continuation determination flag. If the continuation determination condition is not satisfied, continuation determination unit 356 may turn off the continuation determination flag.

If prohibition determination unit 350 determines that the automatic stop control is prohibited, and continuation determination unit 356 determines that prohibition of the automatic stop control will continue for a long period not less than the first time period, priority control prohibition unit 352 prohibits the idle priority control, Thus, priority control prohibition unit 352 causes the idle priority control not to be executed. It is to be noted that, for example, if both the prohibition determination flag and the continuation determination flag are ON, priority control prohibition unit 352 may turn on the idle priority control prohibition flag.

If prohibition determination unit 350 determines that the automatic stop control is not prohibited, priority control permission unit 354 permits the idle priority control. Alternatively, if continuation determination unit 356 determines that prohibition of the automatic stop control will not continue for a long period not less than the first time period, priority control permission unit 354 permits the idle priority control. It is to be noted that, for example, if the prohibition determination flag is OFF or the continuation determination flag is OFF, priority control permission unit 354 may turn off the idle priority control prohibition flag.

Figure 6:
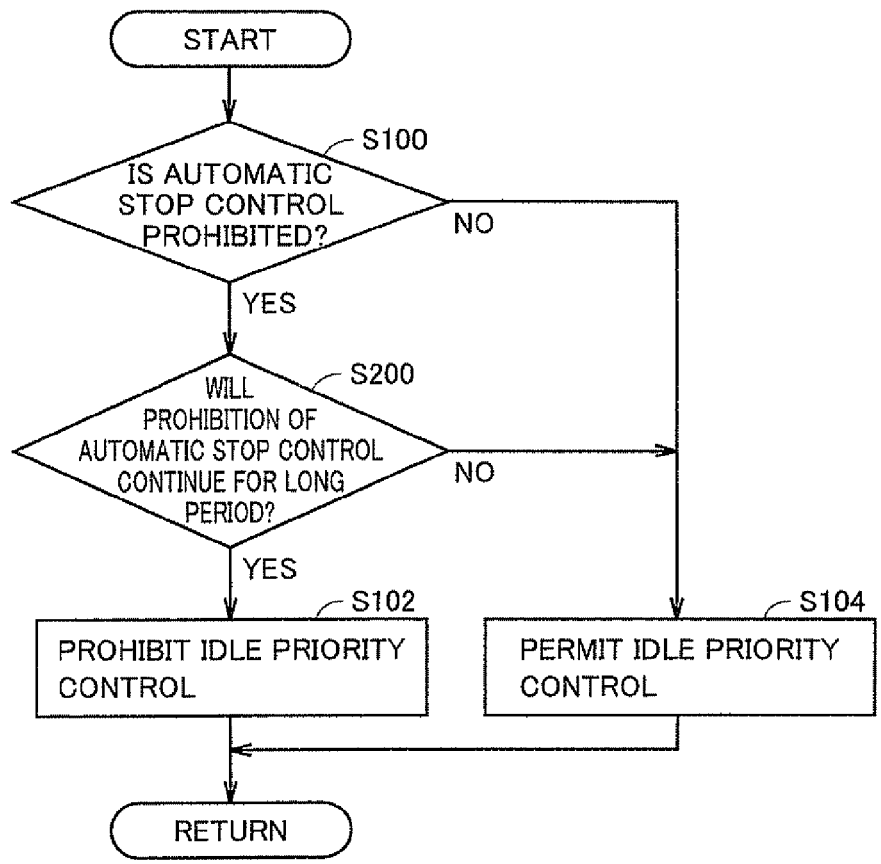
FIG. 6 is a flowchart (part 1) showing a control structure of a program executed by the ECU as the control device for the internal combustion engine in accordance with the second embodiment.

Referring to FIG. 6, a control structure of a program executed by ECU 300 as the control device for the internal combustion engine in accordance with the present embodiment will be described.

It is to be noted that, in the flowchart shown in FIG. 6, steps identical to those in the flowchart shown in FIG. 3 described above will be designated by the same step numbers. Since processes therefor are also the same, the detailed description thereof will not be repeated here.

If the automatic stop control is prohibited (YES in S100), ECU 300 determines in S200 whether or not prohibition of the automatic stop control will continue for a long period. ECU 300 determines that prohibition of the automatic stop control will continue for a long period if the continuation determination flag is ON. ECU 300 determines that prohibition of the automatic stop control will not continue for a long period if the continuation determination flag is OFF. If it is determined that prohibition of the automatic stop control will continue for a long period (YES in S200), the process proceeds to S102. Otherwise (NO in S200), the process proceeds to S104.

Next, referring to FIG. 7, a control structure of a program determining whether or not prohibition of the automatic stop control will continue for a long period executed by ECU 300 as the control device for the internal combustion engine in accordance with the present embodiment will be described.

In S250, ECU 300 determines whether or not the continuation determination condition is satisfied. That is, if at least one of the first continuation condition to the seventh continuation condition is satisfied, ECU 300 determines that the continuation determination condition is satisfied. If the continuation determination condition is satisfied (YES in S250), the process proceeds to S252. Otherwise (NO in S250), the process proceeds to S254.

In S252, ECU 300 turns on the continuation determination flag. In S254, EUC 300 turns off the continuation determination flag.

Figure 8:
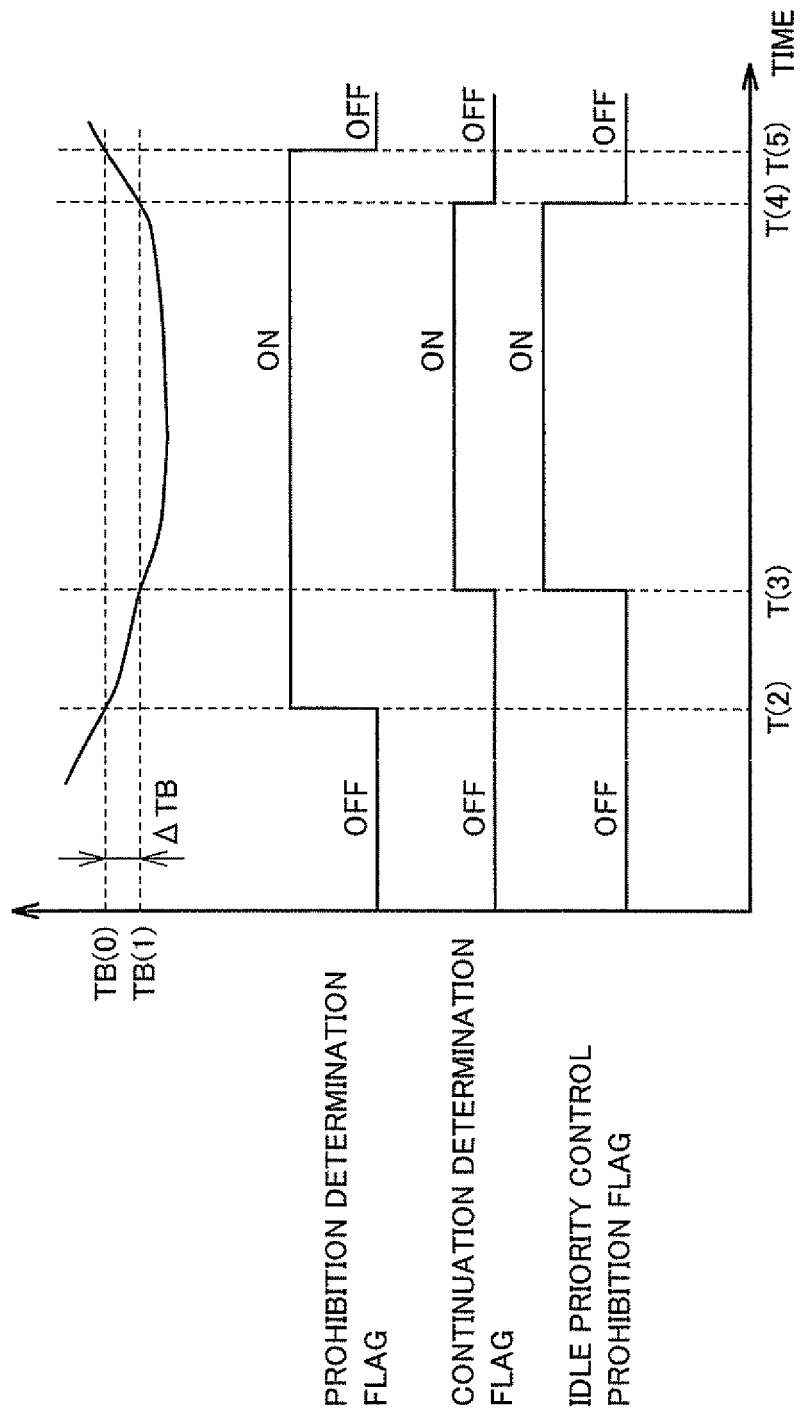
FIG. 8 is a timing chart showing an operation of the ECU as the control device for the internal combustion engine in accordance with the second embodiment.

An operation of ECU 300 as the control device for the internal combustion engine in accordance with the present embodiment based on the structure and the flowchart as described above will be described with reference to FIG. 8. For convenience of description, it is assumed in the present embodiment that, for example, the only thing that is changed is whether or not the first permission condition and the first continuation condition are satisfied, all of the second permission condition to the ninth permission condition are satisfied, and none of the second continuation condition to the seventh continuation condition is satisfied. It is to be noted that, since the operation of ECU 300 in the case where there is a change in whether or not conditions other than the first permission condition and the first continuation condition are satisfied is identical to the operation of ECU 300 in the case where there is a change in whether or not the first permission condition and the first continuation condition are satisfied, the detailed description of the operation of ECU 300 in the case where there is a change in whether or not conditions other than the first permission condition and the first continuation condition are satisfied will not be repeated. Further, a change in battery temperature TB of running battery 220 shown in FIG. 8 is exemplary, and its change is not limited to the change shown in FIG. 8.

For example, it is assumed that the automatic stop permission condition (i.e., the first permission condition to the ninth permission condition) is completely satisfied, and the continuation determination condition (i.e., the first continuation condition to the seventh continuation condition) is completely unsatisfied.

If battery temperature TB of running battery 220 is reduced, and battery temperature TB becomes lower than TB(0) at time T(2), the first permission condition of the automatic stop permission condition is not satisfied. Therefore, the automatic stop control is prohibited (YES in S100). On this occasion, the prohibition determination flag is switched from OFF to ON, as shown in FIG. 8.

If battery temperature TB of running battery 220 is further reduced after the automatic stop control is prohibited, and a value obtained by subtracting a battery temperature TB(1) at present from predetermined temperature TB(0) is greater than predetermined value $\Delta$TB, the first continuation condition is satisfied. That is, the continuation determination condition is satisfied (YES in S250). Therefore, the continuation determination flag is turned on at time T(3) (S252). Since it is determined that prohibition of the automatic stop control will continue for not less than the first time period (YES in S200), the idle priority control is caused not to be executed (S102). As a result, the idle priority control prohibition flag is switched from OFF to ON at time T(3).

Since the automatic stop of engine 120 is not executed when the automatic stop control is prohibited, engine 120 continues operation. Further, if it is determined that prohibition of the automatic stop control will continue for a long period, the idle priority control is caused not to be executed. Therefore, engine 120 is not caused to be forcibly shifted to the idle state.

While engine 120 continues operation, engine 120 frequently enters the idle state for example when the vehicle is in the stopped state and the like. ECU 300 performs the ISC learning, the learning of the air-fuel ratio of the port injection device, and the imbalance diagnosis described above at timing when engine 120 enters the idle state (for example, when the idle switch is turned on, or engine revolution speed NE falls within the range of revolution speed corresponding to the idle revolution speed).

After time T(3), battery temperature TB of running battery 220 starts increasing. If the first continuation condition is not satisfied at time T(4) (NO in S250), the continuation determination flag is turned of (S254). Since it is determined that prohibition of the automatic stop control will not continue for a long period (NO in S200), ECU 300 permits the idle priority control (S104). As a result, the state of the idle priority control prohibition flag is switched from ON to OFF.

After time T(4), battery temperature TB of running battery 220 further continues increasing. If battery temperature TB becomes equal to or higher than predetermined temperature TB(0) at time T(5), the first permission condition is satisfied (i.e., the automatic stop permission condition is satisfied). Since the automatic stop control is permitted on this occasion (NO in S100), the prohibition determination flag is switched from ON to OFF. It is to be noted that prohibition of the idle priority control may be lifted together with permission of the automatic stop control.

If the automatic stop control is permitted, the automatic stop of engine 120 is executed according to the state of hybrid vehicle 10. Therefore, the frequency with which engine 120 enters the idle state is lower than that in the case where the automatic stop is prohibited. In such a case, ECU 300 forcibly shifts the state of engine 120 to the idle state, and performs at least one of the ISC learning, the learning of the air-fuel ratio of the port injection device, and the imbalance diagnosis. ECU 300 terminates the idle priority control upon completion of the learning or diagnosis.

As described above, according to the control device for the internal combustion engine in accordance with the present embodiment, if the automatic stop control is prohibited, and prohibition of the automatic stop control will continue for a long period not less than the first time period, the idle priority control is caused not to be executed, and thereby frequent execution of the idle priority control can be suppressed. Further, since it can be predicted that prohibition of the automatic stop control will continue for a long period not less than the first time period based on whether or not the continuation determination condition is satisfied, lifting of prohibition of the automatic stop control while the ISC learning or the like is performed can be avoided. Consequently, a control device for an internal combustion engine and a control method for an internal combustion engine suppressing degradation of fuel efficiency can be provided.

Although it has been described that the continuation determination condition in the present embodiment includes the first continuation condition to the seventh continuation condition described above, the continuation determination condition is not particularly limited thereto. For example, the continuation determination condition may include conditions described below, instead of the first continuation condition to the fifth continuation condition. The continuation determination condition may include a condition that battery temperature TB of running battery 220 is lower than a predetermined temperature TB(2) (<TB(0)). The continuation determination condition may include a condition that the SOC at present is smaller than a predetermined value SOC(2) (<SOC(0)). The continuation determination condition may include a condition that temperature TW of the cooling water for engine 120 at present is lower than a predetermined temperature TW(2) (<TW(1)). The continuation determination condition may include a condition that temperature Toil of the hydraulic oil in transmission 182 at present is higher than a predetermined temperature Toil(2) (>Toil(0)). The continuation determination condition may include a condition that external air temperature TA is lower than predetermined value TA(0), and temperature TW of the cooling water for engine 120 is lower than predetermined temperature TW(1).

Third Embodiment

Hereinafter, a control device for an internal combustion engine in accordance with a third embodiment will be described. When compared with the configuration of the control device for the internal combustion engine in accordance with the first embodiment described above, the control device for the internal combustion engine in accordance with the present embodiment is different in the operation of ECU 300. Other than that, the configuration of the control device for the internal combustion engine in accordance with the present embodiment is identical to the configuration of the control device for the internal combustion engine in accordance with the first embodiment described above. Identical parts will be designated by the same reference numerals. Since their functions are also the same, the detailed description thereof will not be repeated here.

The present embodiment is characterized in that, if a prohibition condition for the automatic stop control is satisfied, and prohibition of the automatic stop control will continue for not less than a first time period, ECU 300 causes the idle priority control not to be executed before it prohibits the automatic stop control. The prohibition condition for the automatic stop control is a condition that the automatic stop permission condition described above is not satisfied. Since the automatic stop permission condition is as described above, the detailed description thereof will not be repeated.

For example, if it is predicted that the prohibition condition for the automatic stop control will be satisfied, and that prohibition of the automatic stop control will continue for not less than the first time period, ECU 300 may cause the idle priority control to be executed before it prohibits the automatic stop control.

Figure 9:
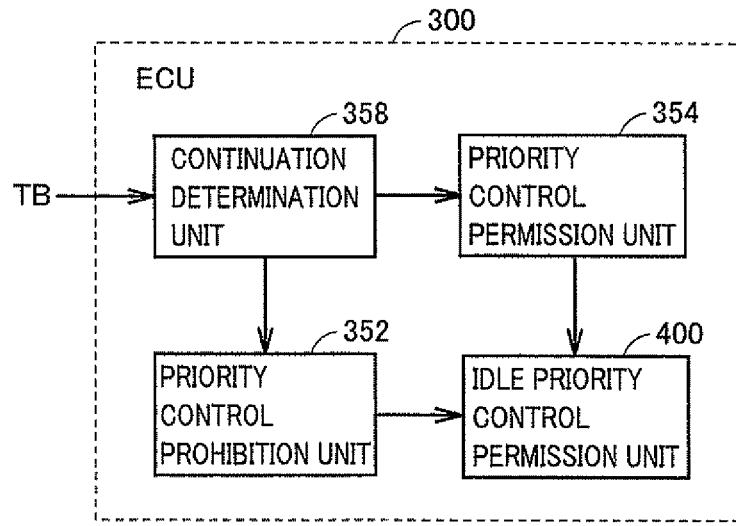
FIG. 9 is a functional block diagram of an ECU as a control device for an internal combustion engine in accordance with a third embodiment.

FIG. 9 shows a functional block diagram of ECU 300 as the control device for the internal combustion engine in accordance with the present embodiment.

ECU 300 includes a continuation determination unit 358, priority control prohibition unit 352, priority control permission unit 354, and idle priority control unit 400. Since idle priority control unit 400 shown in FIG. 5 is identical in function and operation to idle priority control unit 400 shown in FIG. 2, the detailed description thereof will not be repeated.

In the case where the automatic stop control is permitted, continuation determination unit 358 determines whether the automatic stop control will be prohibited later than the present, and whether or not prohibition of the automatic stop control will continue for a long period not less than the first time period. Specifically, continuation determination unit 358 determines whether or not a prediction determination condition for predicting that the automatic stop control will be continuously prohibited for a long period not less than the first time period is satisfied. If the prediction determination condition is satisfied, continuation determination unit 358 determines that the automatic stop control will be continuously prohibited for a long period. It is to be noted that, for example, if continuation determination unit 358 determines that the automatic stop control will be continuously prohibited for a long period, continuation determination unit 358 may turn on the continuation determination flag.

Since the "long period" is identical to the "long period" described in the second embodiment described above, the detailed description thereof will not be repeated.

In the present embodiment, the prediction determination condition includes a first prediction condition to a seventh prediction condition. The first prediction condition is a condition that battery temperature TB of running battery 220 is lower than a predetermined temperature TB(3) (>TB(0)). The second prediction condition is a condition that the SOC at present is smaller than a predetermined value SOC(3) (>SOC(0)). The third prediction condition is a condition that temperature TW of the cooling water for engine 120 at present is lower than a predetermined temperature TW(3) (>TW(0)). The fourth prediction condition is a condition that temperature Toil of the hydraulic oil in transmission 182 at present is higher than a predetermined temperature Toil(3) (<Toil(0)). The fifth prediction condition is a condition that external air temperature TA is lower than predetermined value TA (>TA(0)), and temperature TW of the cooling water for engine 120 is lower than predetermined temperature TW(3). The sixth prediction condition is a condition that running battery 220 is deteriorated. The seventh prediction condition is a condition that the components of the battery system and the electric oil pump for transmission 182 have a failure.

Before the automatic stop control is prohibited, if one of the first prediction condition to the seventh prediction condition described above is satisfied, continuation determination unit 358 determines that the prediction determination condition is satisfied. In this case, continuation determination unit 358 determines that the automatic stop control will be continuously prohibited for a long period.

If continuation determination unit 358 determines that the automatic stop control will be continuously prohibited for a long period (i.e., if one of the first prediction condition to the seventh prediction condition described above is satisfied), priority control prohibition unit 352 prohibits the idle priority control. Thus, priority control prohibition unit 352 causes the idle priority control not to be executed. It is to be noted that, for example, if the continuation determination flag is ON, priority control prohibition unit 352 may turn on the idle priority control prohibition flag.

If continuation determination unit 358 does not determine that the automatic stop control will be continuously prohibited for a long period (i.e., if none of the first prediction condition to the seventh prediction condition described above is satisfied), priority control permission unit 354 permits the idle priority control. It is to be noted that, for example, if the continuation determination flag is OFF, priority control permission unit 354 may turn off the idle priority control prohibition flag.

Figure 10:
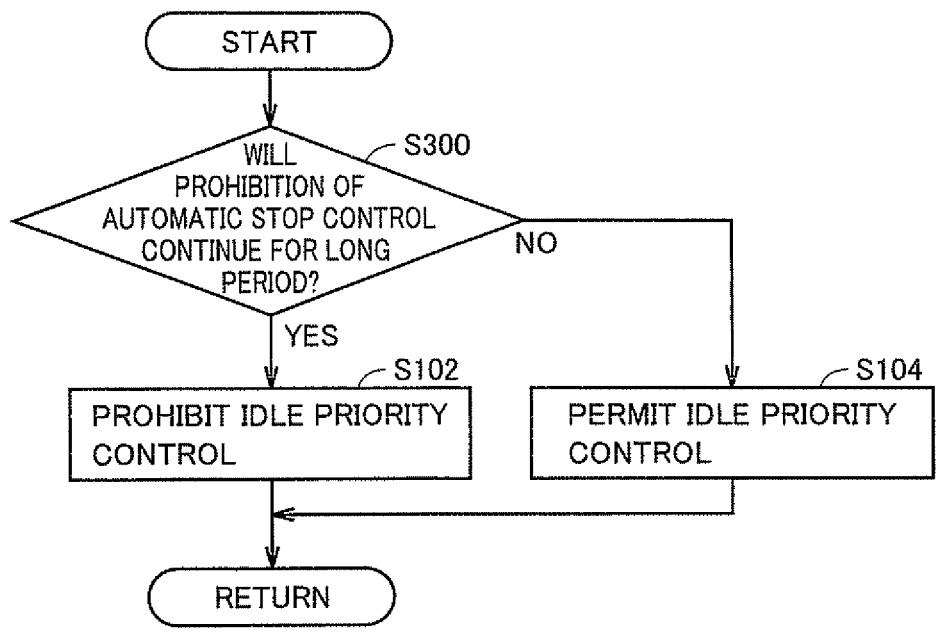
FIG. 10 is a flowchart showing a control structure of a program executed by the ECU as the control device for the internal combustion engine in accordance with the third embodiment.

Referring to FIG. 10, a control structure of a program executed by ECU 300 as the control device for the internal combustion engine in accordance with the present embodiment will be described.

It is to be noted that, in the flowchart shown in FIG. 10, steps identical to those in the flowchart shown in FIG. 3 described above will be designated by the same step numbers. Since processes therefor are also the same, the detailed description thereof will not be repeated here.

ECU 300 determines in S300 whether or not the automatic stop control will be continuously prohibited for a long period, before it prohibits the automatic stop control. If the automatic stop control will be continuously prohibited for a long period (YES in S300), the process proceeds to S102. Otherwise (NO in S300), the process proceeds to S104.

Figure 11:
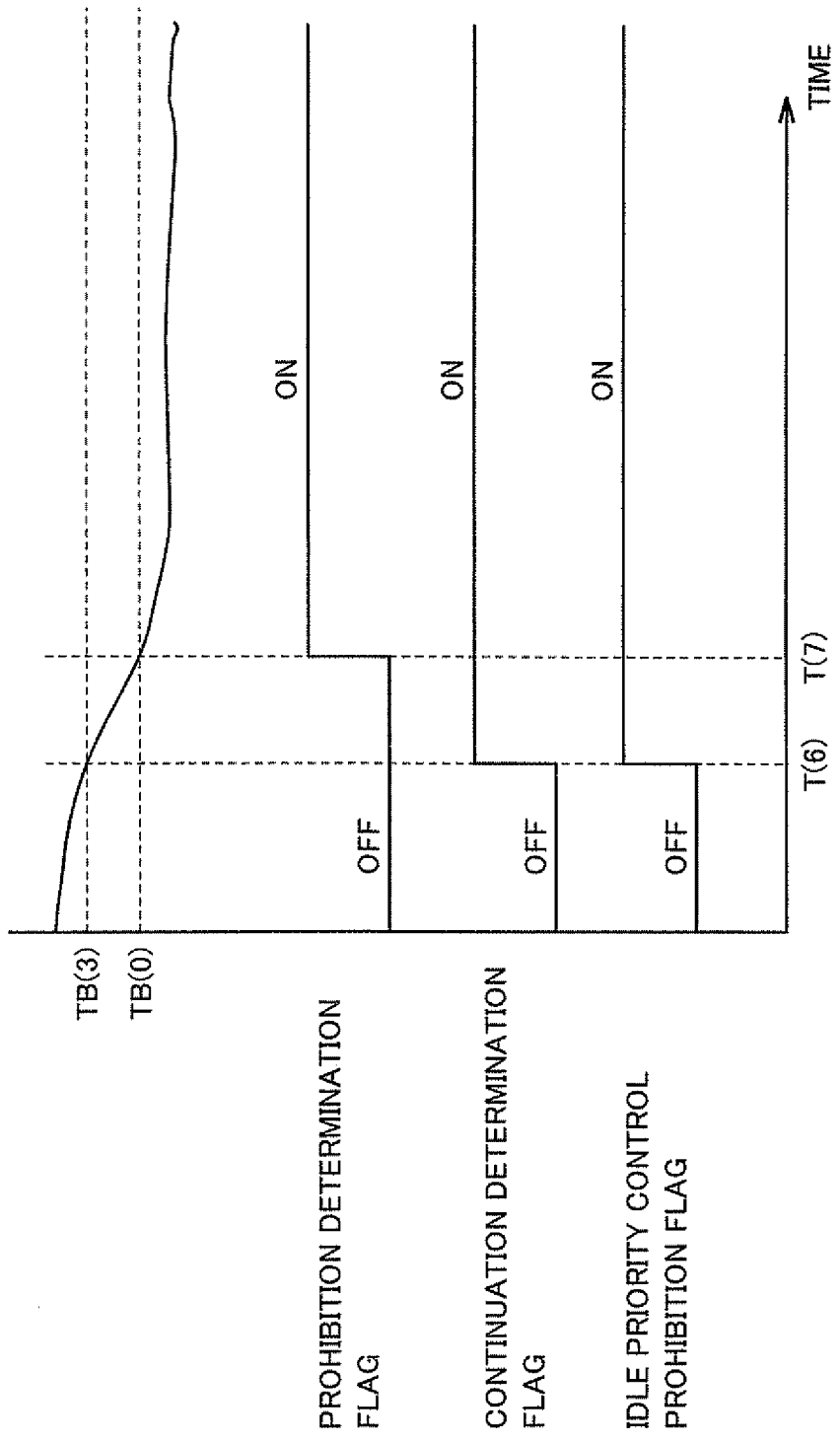
FIG. 11 is a timing chart showing an operation of the ECU as the control device for the internal combustion engine in accordance with the third embodiment.

An operation of ECU 300 as the control device for the internal combustion engine in accordance with the present embodiment based on the structure and the flowchart as described above will be described with reference to FIG. 11. For convenience of description, it is assumed in the present embodiment that, for example, the only thing that is changed is whether or not the first permission condition and the first prediction condition are satisfied, all of the second permission condition to the ninth permission condition are satisfied, and none of the second prediction condition to the seventh prediction condition is satisfied. It is to be noted that, since the operation of ECU 300 in the case where there is a change in whether or not conditions other than the first permission condition and the first prediction condition are satisfied is identical to the operation of ECU 300 in the case where there is a change in whether or not the first permission condition and the first prediction condition are satisfied, the detailed description of the operation of ECU 300 in the case where there is a change in whether or not conditions other than the first permission condition and the first prediction condition are satisfied will not be repeated. Further, a change in battery temperature TB of running battery 220 shown in FIG. 11 is exemplary, and its change is not limited to the change shown in FIG. 11.

For example, it is assumed that the automatic stop permission condition (i.e., the first permission condition to the ninth permission condition) is completely satisfied, and none of the prediction conditions (i.e., the first prediction condition to the seventh prediction condition) is satisfied.

If battery temperature TB of running battery 220 is reduced, and battery temperature TB becomes lower than TB(3) at time T(6), the first prediction condition is satisfied (YES in S300). Since a prediction determination flag is switched from OFF to ON, the idle priority control is caused not to be executed (S102). As a result, the state of the idle priority control prohibition flag is switched from OFF to ON.

At time T(7), if battery temperature TB of running battery 220 is further reduced to be lower than predetermined temperature TB(0), the automatic stop control is prohibited. Therefore, the prohibition determination flag is switched from OFF to ON.

Since the automatic stop of engine 120 is not executed when the automatic stop control is prohibited, engine 120 continues operation. Therefore, engine 120 is not caused to be forcibly shifted to the idle state.

While engine 120 continues operation, engine 120 frequently enters the idle state for example when the vehicle is in the stopped state and the like. ECU 300 performs the ISC learning, the learning of the air-fuel ratio of the port injection device, and the imbalance diagnosis described above at timing when engine 120 enters the idle state (for example, when the idle switch is turned on, or engine revolution speed NE falls within the range of revolution speed corresponding to the idle revolution speed).

As described above, according to the control device for the internal combustion engine in accordance with the present embodiment, if it is predicted that the automatic stop control will be continuously prohibited for a long period not less than the first time period, the idle priority control is caused not to be executed before the automatic stop control is prohibited, and thereby frequent execution of the idle priority control can be suppressed. Further, since it can be predicted that prohibition of the automatic stop control will continue for a long period not less than the first time period based on whether or not the prediction determination condition is satisfied, lifting of prohibition of the automatic stop control while the ISC learning or the like is performed can be avoided. Consequently, a control device for an internal combustion engine and a control method for an internal combustion engine suppressing degradation of fuel efficiency can be provided.

Although it has been described in the present embodiment that, if it is determined that the automatic stop control will be prohibited later than the present, and that prohibition of the automatic stop control will continue for a long period, ECU 300 causes the idle priority control not to be executed, the present invention is not limited thereto. For example, if it is determined that the automatic stop control will be prohibited later than the present, ECU 300 may cause the idle priority control not to be executed. If it is predicted that the automatic stop control will be prohibited, the idle priority control is caused not to be executed before the automatic stop control is prohibited, and thereby frequent execution of the idle priority control can be suppressed. Therefore, degradation of fuel efficiency can be suppressed.

Further, the prediction determination condition may include, for example, a condition that a rate of decrease of battery temperature TB is not less than a threshold value, and a condition that a rate of decrease of the SOC is not less than a threshold value, instead of or in addition to the first prediction condition to the seventh prediction condition.

Fourth Embodiment

Hereinafter, a control device for an internal combustion engine in accordance with a fourth embodiment will be described. When compared with the configuration of the control device for the internal combustion engine in accordance with the first embodiment described above, the control device for the internal combustion engine in accordance with the present embodiment is different in the operation of ECU 300. Other than that, the configuration of the control device for the internal combustion engine in accordance with the present embodiment is identical to the configuration of the control device for the internal combustion engine in accordance with the first embodiment described above. Identical parts will be designated by the same reference numerals. Since their functions are also the same, the detailed description thereof will not be repeated here.

The present embodiment is characterized in that, if the automatic stop control is prohibited, and a temperature-rising time taken until battery temperature TB of running battery 220 at present becomes higher than temperature TB(0) at which the automatic stop control is permitted will be a long period not less than a first time period, ECU 300 causes the idle priority control not to be executed.

When compared with the functional block diagram of ECU 300 as the control device for the internal combustion engine in accordance with the second embodiment shown in FIG. 5, a functional block diagram of ECU 300 as the control device for the internal combustion engine in accordance with the present embodiment is different in the operation of continuation determination unit 356. Other than that, the configuration of ECU 300 as the control device for the internal combustion engine in accordance with the present embodiment is identical to the configuration of ECU 300 as the control device for the internal combustion engine in accordance with the second embodiment shown in FIG. 5, and their functions are also the same. Therefore, the detailed description for the configuration other than continuation determination unit 356 will not be repeated here.

Continuation determination unit 356 determines whether or not the temperature-rising time taken until battery temperature TB of running battery 220 at present becomes higher than temperature TB(0) at which the automatic stop control is permitted will be not less than the first time period. Since the "first time period" is identical to the "first time period" described in the second embodiment described above, the detailed description thereof will not be repeated.

For example, if the value obtained by subtracting battery temperature TB at present from predetermined temperature TB(0) is greater than predetermined value $\Delta TB$, continuation determination unit 356 determines that the temperature-rising time will be not less than the first time period.

Alternatively, if a temperature-rising rate of temperature TB of running battery 220 is lower than a predetermined rate, continuation determination unit 356 may determine that the temperature-rising time will be not less than the first time period. The predetermined rate is a temperature-rising rate in the case where the sum of the temperature of running battery 220 at present and a temperature raised by continuing rising temperature for the first time period at the predetermined rate is not less than predetermined temperature TB(0).

Alternatively, if temperature TB of running battery 220 is lower than a predetermined temperature TB(4) (<TB(0)), continuation determination unit 356 may determine that the temperature-rising time will be not less than the first time period. Here, predetermined temperature TB(4) is a temperature at which temperature-rising is started in the case where the temperature-rising time will be not less than the first time period if the temperature-rising rate of the temperature of running battery 220 is at maximum.

It is to be noted that, for example, if continuation determination unit 356 determines that the temperature-rising time will be not less than the first time period, continuation determination unit 356 may turn on the continuation determination flag, and if continuation determination unit 356 determines that the temperature-rising time will not be not less than the first time period, continuation determination unit 356 may turn off the continuation determination flag.

Figure 7:
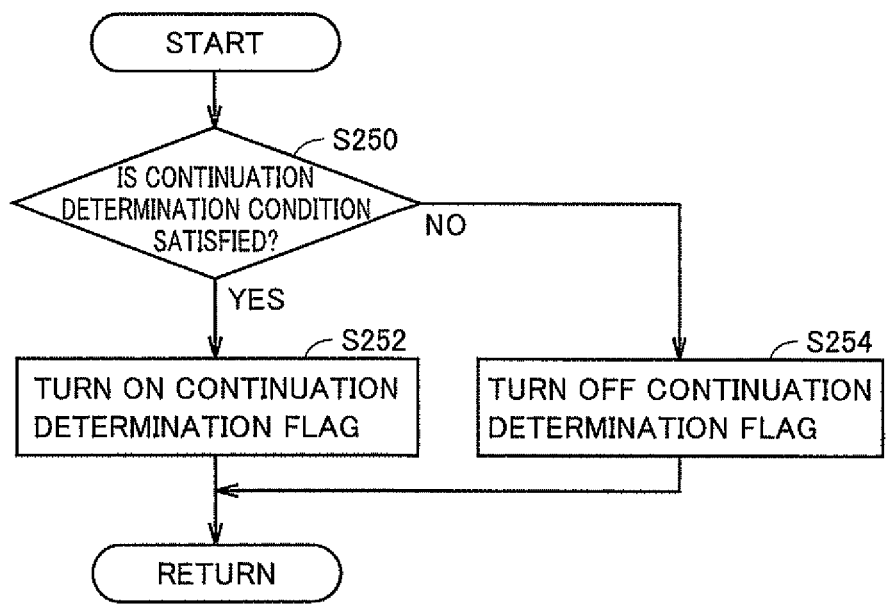
FIG. 7 is a flowchart (part 2) showing a control structure of the program executed by the ECU as the control device for the internal combustion engine in accordance with the second embodiment.

Since a control structure of a program executed by ECU 300 as the control device for the internal combustion engine in accordance with the present embodiment is identical to those shown in the flowcharts of FIGS. 6 and 7, the detailed description thereof will not be repeated.

Figure 12:
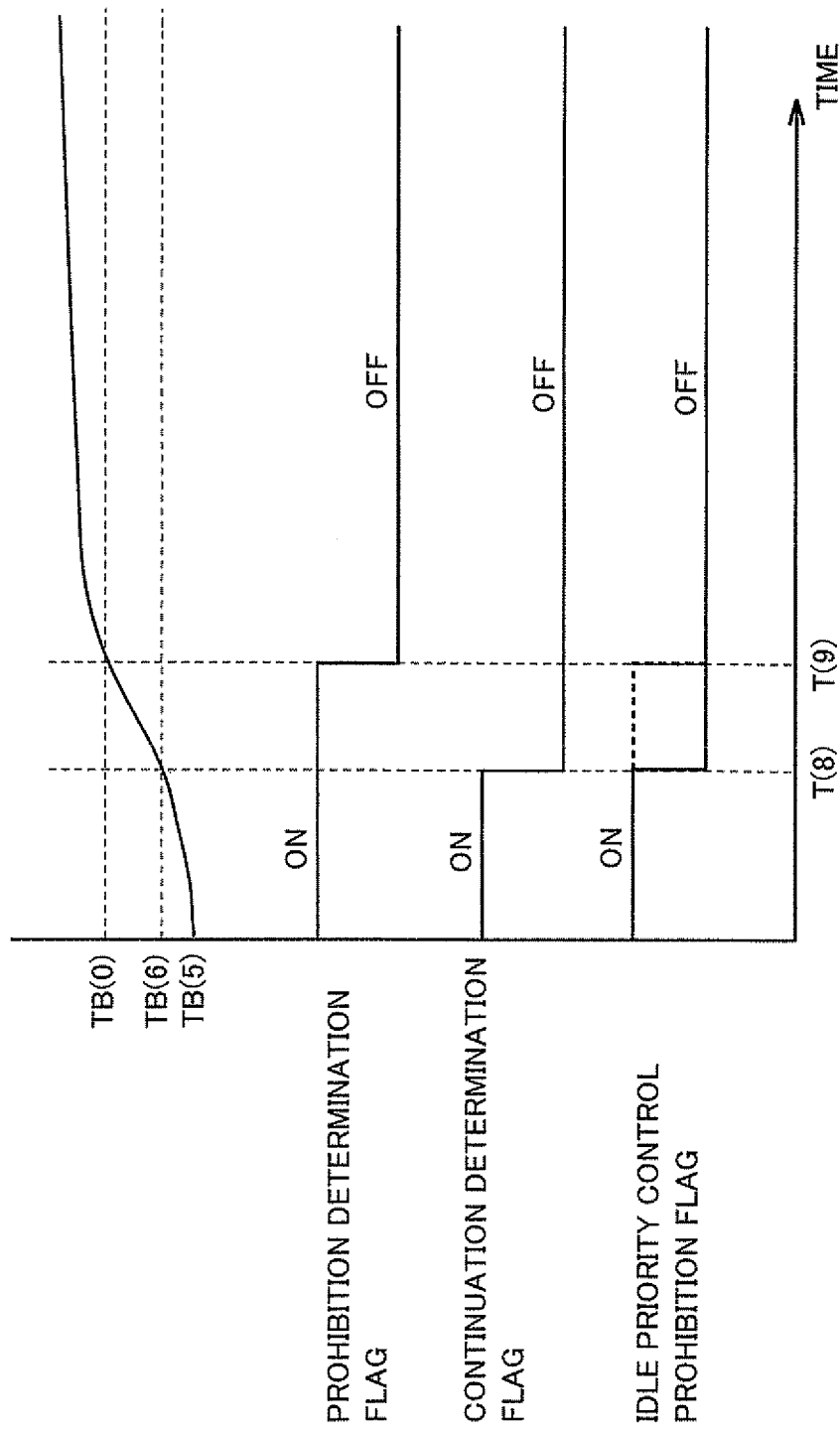
FIG. 12 is a timing chart showing an operation of an ECU as a control device for an internal combustion engine in accordance with a fourth embodiment.

An operation of ECU 300 as the control device for the internal combustion engine in accordance with the present embodiment based on the structure and the flowchart as described above will be described with reference to FIG. 12. For convenience of description, it is assumed in the present embodiment that, for example, the only thing that is changed is whether or not the first permission condition is satisfied, and all of the second permission condition to the ninth permission condition are satisfied. Further, a change in battery temperature TB of running battery 220 shown in FIG. 12 is exemplary, and its change is not limited to the change shown in FIG. 12.

For example, it is assumed that the automatic stop permission condition other than the first permission condition (i.e., the second permission condition to the ninth permission condition) is satisfied.

In this case, since battery temperature TB of running battery 220 is lower than predetermined temperature TB(0), the automatic stop control is prohibited (YES in S100). Therefore, the prohibition determination flag is turned on.

A value obtained by subtracting a battery temperature TB(5) of running battery 220 at present from predetermined temperature TB(0) is greater than ATE. Therefore, it is determined that the temperature-rising time will be not less than the first time period (YES in S200, YES in S250), and thus the continuation determination flag is turned on (S252). As a result, the idle priority control is caused not to be executed (S102), and thus the idle priority control prohibition flag is turned on.

Since the automatic stop of engine 120 is not executed when the automatic stop control is prohibited, engine 120 continues operation. Therefore, engine 120 is not caused to be forcibly shifted to the idle state.

While engine 120 continues operation, engine 120 frequently enters the idle state for example when the vehicle is in the stopped state and the like. ECU 300 performs the ISC learning, the learning of the air-fuel ratio of the port injection device, and the imbalance diagnosis described above at timing when engine 120 enters the idle state (for example, when the idle switch is turned on, or engine revolution speed NE falls within the range of revolution speed corresponding to the idle revolution speed).

Battery temperature TB of running battery 220 increases, and at time T(8), a value obtained by subtracting a battery temperature TB(6) of running battery 220 at present from predetermined temperature TB(0) becomes smaller than $\Delta TB$. Since it is determined on this occasion that the temperature-rising time will not be not less than the first time period (NO in S200, NO in S250), the continuation determination flag is switched from ON to OFF (S254). As a result, the idle priority control is permitted (S104), and thus the idle priority control prohibition flag is switched from ON to OFF.

After time T(8), battery temperature TB of running battery 220 further continues increasing. If battery temperature TB becomes equal to or higher than predetermined temperature TB(0) at time T(9), the first permission condition is satisfied (i.e., the automatic stop permission condition is satisfied), and thus the automatic stop control is permitted (NO in S100). Therefore, the prohibition determination flag is switched from ON to OFF. It is to be noted that the idle priority control may be permitted together with permission of the automatic stop control, as indicated by a broken line in FIG. 12.

If the automatic stop control is permitted, the automatic stop of engine 120 is executed according to the state of hybrid vehicle 10. Therefore, the frequency with which engine 120 enters the idle state is lower than that in the case where the automatic stop is prohibited. In such a case, ECU 300 forcibly shifts the state of engine 120 to the idle state, and performs at least one of the ISC learning, the learning of the air-fuel ratio of the port injection device, and the imbalance diagnosis. ECU 300 terminates the idle priority control upon completion of the learning or diagnosis.

As described above, according to the control device for the internal combustion engine in accordance with the present embodiment, if the automatic stop control is prohibited, and the temperature-rising time taken until battery temperature TB of running battery 220 at present becomes higher than temperature TB(0) at which the automatic stop control is permitted will be not less than the first time period, the idle priority control is caused not to be executed, and thereby frequent execution of the idle priority control can be suppressed. Further, lifting of prohibition of the automatic stop control while the ISC learning or the like is performed can be avoided. Consequently, a control device for an internal combustion engine and a control method for an internal combustion engine suppressing degradation of fuel efficiency can be provided.

It should be understood that the embodiments disclosed herein are illustrative and non-restrictive in every respect. The scope of the present invention is defined by the scope of the claims, rather than the description above, and is intended to include any modifications within the scope and meaning equivalent to the scope of the claims.

REFERENCE SIGNS LIST 10 hybrid vehicle, 120 engine, 122 intake path, 122A air cleaner, 122B intake air temperature sensor, 122C electronic throttle valve, 124 exhaust path, 124A air-fuel ratio sensor, 124B three-way catalytic converter, 124C catalyst temperature sensor, 124D muffler, 130 fuel injection device, 140, 142 MG, 160 drive wheel, 162 drive shaft, 180 reduction gear, 182 transmission, 200 motive power split mechanism, 220 running battery, 240 inverter, 242 converter, 302 current sensor, 304 voltage sensor, 306 battery temperature sensor, 308 accelerator position sensor, 310 air-conditioning switch, 312 wheel speed sensor, 350 prohibition determination unit, 352 priority control prohibition unit, 354 priority control permission unit, 356, 358 continuation determination unit, 360 water temperature sensor, 362 oil temperature sensor, 380 engine revolution speed sensor, 400 idle priority control unit

The invention claimed is:

1. A control device for an internal combustion engine mounted in a vehicle, said vehicle including a rotating electric machine for causing said vehicle to run, and a power storage device for supplying electric power to said rotating electric machine, said control device comprising:
a detection unit for detecting a state of said vehicle; and
a control unit for executing automatic stop control of said internal combustion engine and idle priority control forcibly shifting a state of said internal combustion engine to an idle state, based on the state of said vehicle,
wherein, if said automatic stop control is prohibited, and prohibition of said automatic stop control will continue for not less than a first time period, said control unit causes said idle priority control not to be executed, and
said control unit determines said first time period based on the state of said vehicle.

2. The control device for the internal combustion engine according to claim 1, wherein
if said automatic stop control is prohibited, and a temperature-rising time taken until a temperature of said power storage device at present becomes higher than a temperature at which said automatic stop control is permitted will be not less than said first time period, said control unit causes said idle priority control not to be executed.

3. The control device for the internal combustion engine according to claim 2, wherein, if a temperature-rising rate of the temperature of said power storage device is lower than a predetermined value, said control unit determines that said temperature-rising time will be not less than said first time period.

4. The control device for the internal combustion engine according to claim 2, wherein
if a first temperature of said power storage device detected by said detection unit is lower than a second temperature, said control unit determines that said temperature-rising time will be not less than said first time period, and
said second temperature is a temperature at which temperature-rising is started in a case where said temperature-rising time will be not less than said first time period if a temperature-rising rate of the temperature of said power storage device is at maximum.

5. A control method for an internal combustion engine mounted in a vehicle, said vehicle including a rotating electric machine for causing said vehicle to run, and a power storage device for supplying electric power to said rotating electric machine, said control method comprising the steps of:
detecting a state of said vehicle;
executing automatic stop control of said internal combustion engine and idle priority control forcibly shifting a state of said internal combustion engine to an idle state, based on the state of said vehicle;
causing said idle priority control not to be executed if said automatic stop control is prohibited, and prohibition of said automatic stop control will continue for not less than a first time period; and
determining said first time period based on the state of said vehicle.

* * * * *